United States Patent [19]

Katsuragawa et al.

[11] 3,852,367

[45] Dec. 3, 1974

[54] STABILIZED TRICHLOROETHYLENE OR TETRACHLOROETHYLENE

[75] Inventors: Seiichi Katsuragawa; Norihisa Koketsu, both of Saitama-ken, Japan

[73] Assignee: Central Glass Co., Ltd., Yamaguchi-ken, Japan

[22] Filed: Dec. 21, 1971

[21] Appl. No.: 210,576

[30] Foreign Application Priority Data

Dec. 23, 1970 Japan............................. 45-115687

[52] U.S. Cl............................ 260/652.5 R, 252/171
[51] Int. Cl........................ C07c 17/40, C07c 17/42
[58] Field of Search.................. 260/652.5; 252/171

[56] References Cited
UNITED STATES PATENTS

| | | | |
|---|---|---|---|
| 2,371,644 | 3/1945 | Petering et al............ | 260/652.5 UX |
| 2,906,782 | 9/1959 | Ferri et al................... | 260/652.5 R |
| 2,935,537 | 5/1960 | Daras......................... | 260/652.5 R |
| 2,978,518 | 4/1961 | Daras......................... | 260/652.5 R |
| 2,981,760 | 4/1961 | Ferri et al................... | 260/652.5 R |
| 3,043,888 | 7/1962 | Pray et al.................... | 260/652.5 R |
| 3,133,885 | 5/1964 | Petering et al............. | 260/652.5 R |
| 3,152,191 | 10/1964 | Cormany et al........... | 260/652.5 R |
| 3,188,355 | 6/1965 | Petering..................... | 260/652.5 R |
| 3,293,312 | 12/1966 | Ryckaert et al............ | 260/652.5 R |
| 3,676,507 | 7/1972 | Campbell et al........... | 260/652.5 R |

*Primary Examiner*—Howard T. Mars
*Attorney, Agent, or Firm*—Sherman & Shalloway

[57] ABSTRACT

Trichloroethylene or tetrachloroethylene stabilized against decomposition by heat, light, air, moisture and metals, said trichloroethylene and tetrachloroethylene containing a. glycerin or glycidol;
b. at least one phenolic derivative selected from the group consisting of p-methoxyphenol, 2,6-ditert-butyl-4-methylphenol, p-tert-butylphenol, p-sec-butylphenol and thymol;
c. diisopropylamine; and
d. epichlorohydrin or butylene oxide.

1 Claim, No Drawings

STABILIZED TRICHLOROETHYLENE OR TETRACHLOROETHYLENE

BACKGROUND OF THE INVENTION

This invention relates to trichloroethylene or tetrachloroethylene, which has been stabilized against decomposition by heat, light, air, moisture and metals.

Since trichloroethylene and tetrachloroethylene possess degreasing power, they are widely used as a degreaser of metallic products or for dry cleaning of textile fabrics to exhibit good extraction of oils and fats. However, trichloroethylene and tetrachloroethylene, being susceptible to decomposition by the action of such as heat, light, air, moisture and metals, tend to form such acid products as dichloroacetic acid or hydrochloric acid, as well as such toxic products as phosgene and tarry substances. In consequence, serious difficulties are encountered at times in the storage, transportation, use and recovery of trichloroethylene and tetrachloroethylene.

When trichloroethylene or tetrachloroethylene containing such decomposing products as hydrochloric acid even in a small quantity is used as a cleaning agent for practical purposes, metals are often corroded and textile fabrics are damaged. Consequently, trichloroethylene or tetrachloroethylene to be used for industrial purposes must be stabilized to a high degree. The foregoing decomposition reaction hardly occurs when the trichloroethylene or tetrachloroethylene is of high purity. However, the commercial production of trichloroethylene or tetrachloroethylene of such high purity is not only difficult technologically but economically as well. Commercially produced trichloroethylene or tetrachloroethylene are usually susceptible to decomposition by heat, light, air, moisture and metals.

For preventing such a decomposition, the practice heretofore was to stabilize the trichlorethylene or tetrachloroethylene by adding singly or in combination such compounds as, for example, the phenols, aliphatic epoxides, alcohols, amines and aliphatic nitriles. However, it frequently happened that the trichloroethylene or tetrachloroethylene containing these stabilizing compounds in a suitable amount did not have a satisfactory stability when used under relatively harsh conditions. This happened because of the infinite variety of the users' cleaning conditions (e.g. differences in the type of cleaning machine used, method of heating, class of oil, amount of moisture content, the article to be cleansed, etc.) and hence difficulty was experienced in obtaining a stability in which all the cleansing conditions were completely surmounted.

SUMMARY OF THE INVENTION

The present invention provides a stabilized trichloroethylene or tetrachloroethylene containing
a. glycerin or glycidol;
b. at least one phenolic derivative selected from the group consisting of p-methoxyphenol, 2,6-ditertbutyl-4-methylphenol, p-tert-butylphenol, p-sec-butylphenol and thymol;
c. diisopropylamine; and
d. epichlorohydrin or butylene oxide.

According to the present invention, stabilized trichloroethylene or tetrachloroethylene compositions contain, based on the weight of trichloroethylene or tetrachloroethylene, the following:

a. 0.0001 – 1.0 weight %, preferably 0.001 – 1.0 weight %, and most preferably 0.01 – 0.5 weight %, of glycerin or glycidol
b. 0.00001 – 0.1 weight %, and preferably 0.0001 – 0.01 weight %, of at least one phenolic derivative selected from the group consisting of p-methoxyphenol, 2,6-ditert-butyl-4-methylphenol, p-tert-butylphenol, p-sec-butylphenol and thymol;
c. 0.0001 – 0.1 weight %, and preferably 0.005 – 0.05 weight %, of diisopropylamine; and
d. 0.001 – 1.0 weight %, and preferably 0.01 – 0.5 weight %, of epichlorohydrin or butylene oxide.

The stabilized trichloroethylene or tetrachloroethylene composition of the present invention contains the four components in the ranges hereinabove indicated, and, as a result, possesses an excellent stability to decomposition by heat, light, air, moisture and metals.

Trichloroethylene or tetrachloroethylene containing the aforesaid four components in an amount less than the foregoing ranges does not possess a satisfactory stability. On the other hand, trichloroethylene or tetrachloroethylene containing the aforesaid four components in amounts exceeding the foregoing limits does not have any increased stability. Again, addition in such large amounts would not be an advantage economically.

Trichloroethylene or tetrachloroethylene which does not contain at least one of each of the aforesaid four components does not possess a satisfactory stability to decomposition by heat, light, air, moisture and metals.

Any of the customary procedures may be employed in adding the aforesaid four components to the trichloroethylene or tetrachloroethylene. The four components may be added in any sequence or may be added at the same time. The addition is preferably carried out with stirring at normal atmospheric pressure and ambient temperature.

In the following experiments the determination of the stability was made by means of the iron piece dipping corrosion test, a test in accordance with the Method of Testing Trichloroethylene (JIS K 1508 standards), and the Stabilization Test of Perchloroethylene in accordance with the standards of the National Institute of Dry Cleaners (hereinafter referred to as the NID Standard Test). These three testing methods were found to be tests that were necessary as a result of having made comparisons with the stability tests of the cleaning solvent in the various practical cleaning methods. A high degree of stability is guaranteed only in the case of the trichlorethylene or tetrachloroethylene which demonstrates good results in all three of these tests.

EXAMPLES

1. Iron piece dipping corrosion test.
A soft iron piece [dimensions 0.5 mm (thickness) × 13 mm × 50 mm] whose surface has been lustered by polishing is dipped in trichloroethylene or tetrachloroethylene containing the prescribed stabilizers and left standing for a given period of time at room temperature. Then the state of corrosion of the soft iron piece is observed with the naked eye.
2. Test in accordance with the JIS K-1508 standards.

Two hundred milliliters of trichloroethylene or tetrachloroethylene containing the prescribed stabilizers is charged to a 500 ml flask equipped with a reflux condenser and an oxygen inlet tube. A soft iron piece [dimensions 0.5 mm (thickness) × 6 mm × 20 mm] whose surface has been lustered by polishing is dipped in the foregoing sample liquid, while another soft iron piece [dimension 0.5 mm (thickness) × 13 mm × 50 mm] is suspended in the vapor phase. This is followed by introducing water-saturated oxygen into the sample liquid at the rate of 10 – 12 bubbles per minute while heating the bottom of the flask by irradiation with a 150-W electric lamp. After continuing the heating and the introduction of the oxygen for 48 hours, the sample liquid is cooled to room temperature, and the conditions of the soft iron pieces and the sample liquid are observed. Further, the pH of the sample liquid is then determined in the following manner for ascertaining the extent of its decomposition. Fifty milliliter of the sample liquid and 50 milliliter of pure water of pH 6.5 are placed in a 100-ml separating funnel and shaken vigorously for 2 minutes. The pH of the water layer is then measured and this is compared with the similarly obtained pH of the sample liquid before its use in the foregoing test.

3. Test in accordance with the NID standard test.

One hundred milliliters of trichloroethylene or tetrachloroethylene containing the prescribed stabilizers are placed in a 300-ml flask, after which a copper piece [dimensions of 0.55 mm (thickness) × 20 mm × 75 mm] whose surface has been lustered by polishing is placed in the flask. Next, after adding 0.5 milliliter of water, a Soxhlet extractor is attached and a similar copper piece is placed therein. Further, above the Soxhlet extractor is attached a valve type condenser, and in the lower end thereof there is suspended a similar copper piece. So as to effect the condensation of the foregoing copper pieces of the trichloroethylene or tetrachloroethylene by evaporation, the bottom of the flask is heated by means of a heater. On the other hand, irradiation by means of a 100-W electric lamp disposed at a point 2.5 centimeters from the Soxhlet extractor is carried out for effecting the oxidation by exposure to light.

After continuing the foregoing test for 48 hours, the total weight loss of the copper pieces and the increase in the acid component in the sample liquids, as measured by the same procedure as in test (2), are determined.

The results obtained in the foregoing tests, (1), (2) and (3) are shown in the following tables.

Table

RESULTS OF STABILITY TESTS OF TRICHLOROETHYLENE AND TETRACHLOROETHYLENE

| Experiment No. | TCE or PCE | Stabilizer (%) | | | | | | | | | | |
|---|---|---|---|---|---|---|---|---|---|---|---|---|
| | | GCE | GCD | PMP | BHT | PBP | PSBP | TM | DIPA | ECH | BO | Others |
| 1 | TCE | | | | — | | | | | | | |
| 2 | do. | | | | 0.001 | | | | | | | |
| 3 | do. | | | | do. | | | | | 0.1 | | |
| 4 | do. | | | | do. | | | | 0.012 | | | |
| 5 | do. | | | | do. | | | | do. | 0.1 | | |
| 6 | PCE | | | | do. | | | | | do. | | TEA 0.02 |
| 7 | TCE | | 0.1 | 0.01 | do. | | | | | | | |
| 8 | do. | 0.001 | | 0.01 | | | | | | | | |
| 9 | do. | | | | 0.01 | | | | 0.012 | 0.1 | | n-BuOH 0.2 |
| 10 | do. | | | | do. | | | | | do. | | STA 0.01 |
| 11 | do. | | 0.1 | | | | | | 0.001 | do. | | DAA 0.018 |
| 12 | PCE | 0.01 | | | | | | | do. | do. | | DEA 0.02 |
| 13 | TCE | | 0.1 | | | | | | | do. | | TEA 0.007 |
| 14 | do. | | do. | | | | | | | do. | | MH 0.017 |
| 15 | do. | 0.01 | | | | | | | 0.01 | 0.004 | | IPA 0.005 |
| 16 | do. | | 0.1 | 0.02 | | | | | 0.012 | | | |
| 17 | TCE | | | | (commercial product) | | | | | | | |
| 18 | PCE | | 0.1 | | 0.001 | | | | 0.012 | 0.1 | | |
| 19 | TCE | 0.01 | | | do. | | | | do. | do. | | |
| 20 | PCE | | | | do. | | | | do. | do. | | |
| 21 | TCE | | 0.1 | | do. | | | | do. | do. | | |
| 22 | PCE | 0.01 | | 0.01 | | | | | do. | do. | | water content 100 ppm. water saturated |
| 23 | do. | do. | | | | | | 0.1 | do. | do. | | |
| 24 | TCE | | 0.1 | | | 0.002 | | | do. | do. | | |
| 25 | do. | | do. | | | | 0.002 | | do. | do. | | |
| 26 | do. | | do. | | 0.001 | | | | 0.01 | | 0.2 | |
| 27 | PCE | | do. | | 0.002 | | | | 0.02 | | 0.1 | |
| 28 | TCE | 0.01 | | 0.001 | 0.001 | | | | 0.01 | 0.1 | | |

TCE : trichloroethylene
PCE : tetrachloroethylene
GOE : glycerin
GCD : glycidol
PMP : p-methoxyphenol
BHT : 2,6-di-tert.-butyl-4-methylphenol
PBP : p-tert.-butylphenol
PSBP: p-sec.-butylphenol
TM : thymol
DIPA: diisopropylamine
ECH : epichlorohydrin
BO : butylene oxide
TEA : triethylamine
n-BuOH: n-butanol
STA : stearylamine
DAA : diarylamine
DEA : diethanolamine
MH : morpholine
IPA : isopropylamine

Table

RESULTS OF STABILITY TEST OF TRICHLOROETHYLENE AND TETRACHLOROETHYLENE

| No. | Test in Accordance with JIS K-1508 Standard Test for TCE | | | | | Test in Accordance with NID Standard Test for PCE | | | | | | | Iron Piece Dipping Corrosion Test (room temp.) |
|---|---|---|---|---|---|---|---|---|---|---|---|---|---|
| | Liquid phase | Iron Piece in Liquid | Iron Piece in Vapor Phase | Change in pH Before | After | Liquid Phase | Copper Piece in Liquid | Copper Piece in Soxhlet | Copper Piece in Vapor Phase | Wt Loss of Copper Piece (mg) | Change in pH Before | After | |
| 1 | o | rusting of whole surface | rusting of whole surface | 6.5 | 1.8 | brown | o | o | corroded | 21.6 | 6.5 | 5.8 | rust appears after 2 days |
| 2 | o | " | " | 6.5 | 2.0 | o | o | o | partly corroded | 4.2 | 6.5 | 6.4 | " |
| 3 | o | " | " | 6.5 | 1.9 | o | o | o | " | 2.8 | 6.5 | 6.5 | " |
| 4 | o | o | o | 10.0 | 9.9 | light yellow | o | o | o | 1.5 | 10.0 | 10.0 | " |
| 5 | o | o | o | 9.8 | 9.8 | o | o | o | o | 3.0 | 9.8 | 9.8 | rust appears after 3 days |
| 6 | o | o | o | 9.3 | 9.1 | light yellow | o | o | partly corroded | 4.2 | 9.3 | 9.3 | " |
| 7 | o | rusting of whole surface | rusting of whole surface | 6.5 | 2.1 | o | o | o | " | 2.6 | 6.5 | 6.4 | no rusting after 30 days |
| 8 | o | " | " | 6.5 | 2.0 | o | o | o | " | 0.0 | 6.5 | 6.3 | no rusting after 20 days |
| 9 | o | o | o | 10.1 | 10.1 | o | o | o | o | 0.6 | 10.1 | 10.1 | rust appears after 3 days |
| 10 | o | rusting of whole surface | rusting of whole surface | 6.5 | 2.1 | yellow | o | o | o | 7.0 | 6.5 | 5.7 | rust appears after 7 days |
| 11 | light yellow | o | o | 9.1 | 9.2 | yellow | no luster | o | o | 0.0 | 9.1 | 8.7 | no rusting after 7 days |
| 12 | o | o | o | 8.2 | 6.9 | " | " | o | o | 2.1 | 8.2 | 6.5 | " |
| 13 | yellowish | o | o | 8.9 | 8.6 | " | o | o | o | 3.4 | 8.9 | 8.8 | " |
| 14 | o | o | o | 8.8 | 8.7 | " | corroded | loss of luster | loss of luster | 2.6 | 8.8 | 8.6 | " |
| 15 | light yellow | rusting of whole surface | rusting of whole surface | 9.4 | 1.8 | light yellow | o | partly corroded | partly corroded | 4.0 | 9.4 | 6.9 | " |
| 16 | o | o | o | 10.0 | 10.0 | yellowish | o | o | o | 0.1 | 10.0 | 10.0 | no rusting after 10 days |
| 17 | o | o | o | 10.6 | 10.6 | yellow | o | o | partly corroded | 1.5 | 10.6 | 10.6 | small amount of black rust after 3 days |
| 18 | o | o | o | 10.0 | 10.0 | o | o | o | o | 0.4 | 10.0 | 10.0 | no rusting after 30 days |
| 19 | o | o | o | 10.1 | 10.1 | o | o | o | o | 1.2 | 10.1 | 10.1 | " |
| 20 | o | o | o | 9.8 | 9.8 | o | o | o | o | 1.8 | 9.8 | 9.8 | " |
| 21 | o | o | o | 10.0 | 10.0 | o | o | o | o | 2.4 | 10.0 | 10.0 | no rusting after 30 days |
| 22 | o | o | o | 9.8 | 9.8 | o | o | o | o | 1.3 | 9.8 | 9.8 | " |
| 23 | o | o | o | 9.9 | 9.9 | o | o | o | o | 0.8 | 9.9 | 9.9 | " |
| 24 | o | o | o | 9.5 | 9.5 | o | o | o | o | 1.6 | 9.5 | 9.6 | " |
| 25 | o | o | o | 9.4 | 9.4 | o | o | o | o | 0.1 | 9.4 | 9.4 | " |
| 26 | o | o | o | 9.1 | 9.0 | o | o | o | o | 4.0 | 9.1 | 9.1 | " |

Table

RESULTS OF STABILITY TEST OF TRICHLOROETHYLENE AND TETRACHLOROETHYLENE

| No. | Test in Accordance with JIS K-1508 Standard Test for TCE | | | | | Test in Accordance with NID Standard Test for PCE | | | | | | Iron Piece Dipping Corrosion Test (room temp.) |
|---|---|---|---|---|---|---|---|---|---|---|---|---|
| | Liquid Phase | Iron Piece in Liquid | Iron Piece in Vapor Phase | Change in pH | | Liquid Phase | Copper Piece in Liquid | Copper Piece in Soxhlet | Copper Piece in Vapor Phase | Wt Loss of Copper Piece (mg) | Change in pH | |
| | | | | Before | After | | | | | | Before | After | |
| 27 | o | o | o | 10.4 | 10.4 | o | o | o | o | 5.6 | 10.4 | 10.4 | " |
| 28 | o | o | o | 9.2 | 9.2 | o | o | o | o | 0.0 | 9.2 | 9.2 | " |

Note - 1) o : No change.

2) Experiment Nos. 1 - 17 are Controls and Experiment Nos. 18 - 28 are Examples of this invention.

It is seen from the foregoing tables that the trichloroethylene or tetrachloroethylene containing the four components of the invention demonstrate excellent results in all three tests: the test in accordance with JIS K-1508 standard test, the test in accordance with the NID standard test, and the iron piece dipping corrosion test. On the other hand, it is seen that in the case of trichloroethylene or tetrachloroethylene which does not contain at least one of each of the four components or in the case of the commercially available product, unsatisfactory results are obtained in one or more of the foregoing three classes of tests.

What is claimed is:
1. A stabilized composition consisting essentially of trichloroethylene or tetrachloroethylene and
   a. 0.0001 to 1.0 weight percent of glycerin;
   b. 0.00001 to 0.1 weight percent of at least one phenolic derivative selected from the group consisting of p-methoxyphenol, 2,6-di-tert.-butyl-4-methylphenol, p-tert-butylphenol, p-sec-butylphenol and thymol;
   c. 0.0001 to 0.1 weight percent of diisopropylamine; and
   d. 0.001 to 1.0 weight percent of epichlorohydrin.

* * * * *